United States Patent [19]

DeKeyser et al.

[11] 4,053,405
[45] Oct. 11, 1977

[54] WARNING DEVICE AND METHOD FOR FUEL FILTERING SYSTEMS

[75] Inventors: Richard A. DeKeyser, Edelstein; John H. Parks, Peoria, both of Ill.

[73] Assignee: Caterpillar Tractor Co., Peoria, Ill.

[21] Appl. No.: 699,756

[22] Filed: June 25, 1976

[51] Int. Cl.$^2$ .................... B01D 37/00; C02B 3/02
[52] U.S. Cl. .................... 210/65; 137/172; 210/86; 210/119; 210/123; 210/430; 210/432
[58] Field of Search .................... 210/65, 85, 86, 97, 210/117, 119, 121, 123, 128, 129, 136, 430, 431, 432; 137/172

[56] References Cited

U.S. PATENT DOCUMENTS

| 2,170,247 | 8/1939 | Lambert | 137/172 |
| 2,311,697 | 2/1943 | Samiran | 137/172 |
| 2,525,154 | 10/1950 | Taylor | 137/172 |
| 2,680,538 | 6/1954 | Fishburn | 137/172 |

*Primary Examiner*—Frank W. Lutter
*Assistant Examiner*—Frank Sever

*Attorney, Agent, or Firm*—Phillips, Moore, Weissenberger, Lempio & Majestic

[57] ABSTRACT

A fuel filtering system comprises a case having a cartridge-type filter disposed therein, along with a separator which defines a reservoir. Fuel, such as diesel fuel, is adapted to normally enter an inlet to the case, flow through the filter and thence to an outlet of the case for engine consumption purposes. A valve member, having a specific gravity less than water but greater than that of the fuel, is movably mounted adjacent to the outlet. When the level of water in the reservoir exceeds a predetermined level, the valve member will float on the water and move upwardly to at least partially close-off communication of fuel to the outlet to thus adversely affect engine performance whereby the vehicle operator is alerted to the water-in-fuel problem. In a first embodiment of this invention, such valve member comprises a tubular member mounted exteriorly on a tube defining the outlet therein whereas in a second such embodiment the valve member comprises a spherical ball movably mounted in the tubular member.

20 Claims, 3 Drawing Figures

WARNING DEVICE AND METHOD FOR FUEL FILTERING SYSTEMS

BACKGROUND OF THE INVENTION

This invention relates to a warning device particularly adapted for use in fuel filtering systems for internal combustion engines. Such a system normally comprises a case having a cartridge-type filter mounted therein and a separator plate for defining a reservoir, adapted to retain any separated water therein. Such water normally accumulates periodically due to condensation in the system and requires periodic emptying.

In the event that the water exceeds a predetermined maximum level, engine performance could be adversely affected. In particular, such water may cause a breakdown of the lubricating film normally associated with the fuel, such as diesel fuel, with the result that the component parts of the engine become corroded and subject to undue wear. Thus, the water-in-fuel problem has heretofore been solved by sole reliance on the operator or servicing personnel to periodically inspect and empty the water from the fuel system.

SUMMARY OF THIS INVENTION

An object of this invention is to overcome the above, briefly described problem by providing a non-complex, economical and readily serviceable warning device and method for fuel filtering systems employed on internal combustion engines and the like.

The fuel filtering system of this invention comprises a case having a filter disposed therein to normally communicate fuel from an inlet to an outlet thereof. A separator is also preferably disposed in the case to define a reservoir adapted to retain water therein which separates from the fuel. The crux of this invention resides in the provision of means in the system, responsive to the level of water therein, to at least partially close off communication of fuel to the outlet.

In a first described embodiment of this invention, such means comprises an annular valve member reciprocally mounted on a tubular member, defining the outlet therein, to progressively mask a plurality of ports formed through the member. In a second such embodiment, the means comprises a spherical ball member reciprocally mounted within the tubular member, which further has a seat defined therein. In both such embodiments, the valve member floats on the water to partially close-off communication of fuel to the engine whereby engine performance is adversely affected to alert the vehicle operator of the water-in-fuel problem. An orifice is preferably formed in the tubular member to allow only enough fuel to the engine to sustain partial power.

BRIEF DESCRIPTION OF THE DRAWING

Other objects of this invention will become apparent from the following description and accompanying drawings wherein.

DETAILED DESCRIPTION

Figure 1:
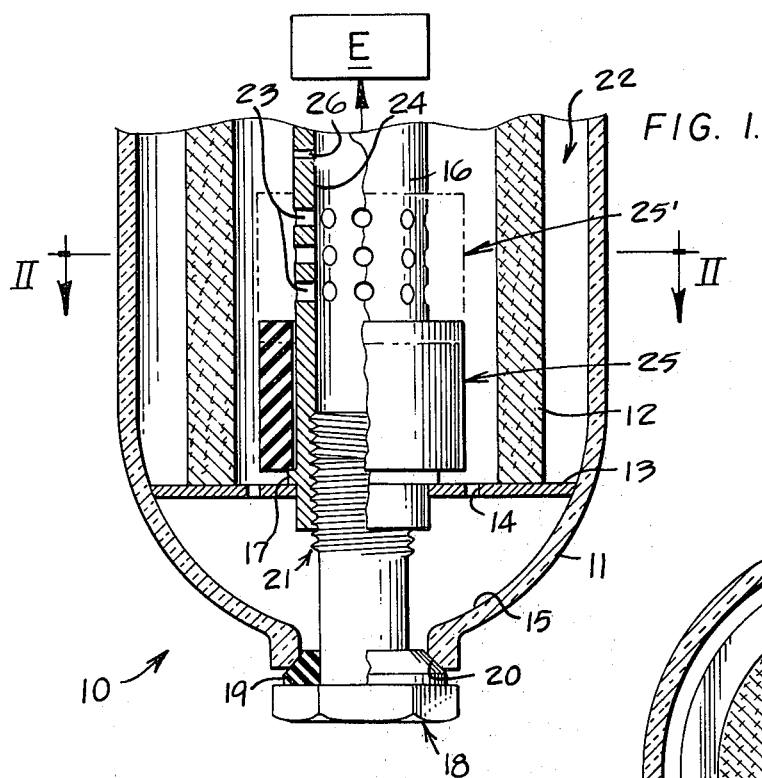
FIG. 1 is a partial longitudinal sectional view of a first fuel filtering system embodiment of this invention.
Figure 2:
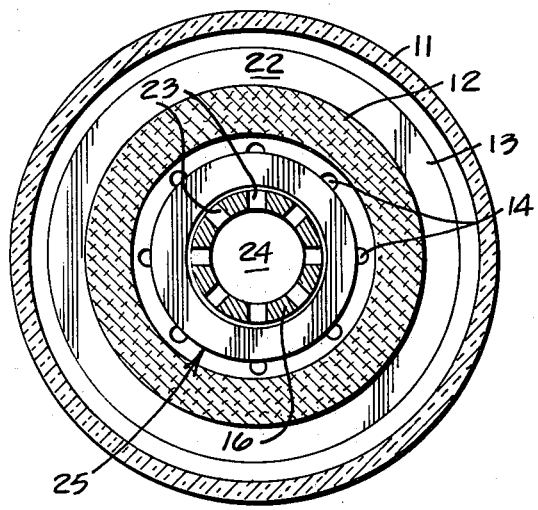
FIG. 2 is a transverse cross sectional view of the system, taken in the direction of arrows II—II in FIG. 1.

FIG. 1 illustrates a fuel filtering system 10 comprising a case 11 having a cylindrical cartridge-type filter 12 disposed therein. The filter is suitably mounted in the case in a conventional manner and the lower end thereof rests on an annular separator plate 13, also suitably disposed in case 11. As shown in FIG. 2, a plurality of circumferentially disposed ports or port means 14 are formed through the separator plate to communicate water to a reservoir 15, defined at a lower end of case 11.

A tubular member 16 is disposed radially inwardly from filter 12 and on the central longitudinal axis of case 11. The member comprises a radial flange 17, formed integrally on a lower end thereof, which rests on separator plate 13. A bolt 18 has an annular elastomeric seal or sealing means 19 disposed on the head thereof to sealingly engage the lower open end 20 of case 11. The shank of the bolt is threadably mounted to a lower end of member 16 at interengaging screw threads 21. Thus, upon removal of bolt 18, reservoir 15 will be vented to ambient to remove any water accumulated therein from the filtering system.

In the event that the filtering system is not vented in such a manner, excess water in the system could function to adversely affect performance of an engine E and to corrode or otherwise damage component parts thereof. To this end, applicant's invention provides a means and method responsive to the level of such water, exceeding a predetermined maximum, for at least partially closing off communication of fuel egressing from the system for engine consumption purposes.

In operation, unfiltered fuel normally enters an annular inlet passage 22, defined between case 11 and filter 12. The fuel then passes through the filter and into a plurality of ports or port means 23 formed through the sidewalls of member 16. The ports communicate the fuel to an outlet passage 24 defined in the member whereby the filtered fuel is consumed by engine E.

As shown in FIG. 1, a cylindrical valve member 25, having a specific gravity greater than that of the fuel but less than that of water, is reciprocally mounted in circumventing relationship on member 16 and is disposed at its lowermost end during normal engine operation. However, should water in the reservoir exceed a predetermined maximum level whereby the water seeps through ports 14, above separator plate 13, such water will progressively raise valve member 25 to its 25' float position. Engine performance will thus be affected (starved of fuel) and the operator will be warned that the fuel system requires servicing. An orifice 26 is preferably formed in tubular member 16 to allow only enough fuel to the engine by bypassing the closed valve member to sustain partial power. Valve member 25 may be composed of any suitable material, such as a plastic or rubber-based composition chemically inert when exposed to the fuel, which has a specific gravity less than water but more than that of the fuel.

For example, the specific gravity of gasoline approximates 0.70 and that of diesel fuel approximates 0.80. Water, of course, has a specific gravity closely approximating 1.0. Thus the specific gravity of the material composing valve member 25 may be selected from the range of approximately 0.70 to 1.0. Such relative specific gravities will permit valve member 25 to normally descend to its FIG. 1 position during normal engine operation since it will "sink-in" the fuel whereas raising of the water above reservoir 15 will effectively float the buoyant valve member which has a specific gravity less than that of water.

Figure 3:
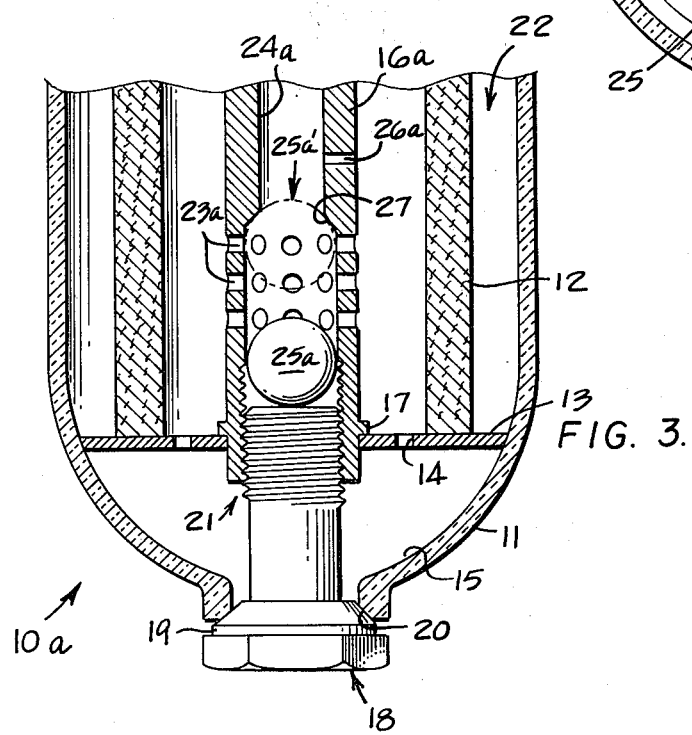
FIG. 3 is a view similar to FIG. 1, but illustrating a second fuel filtering system embodiment of this invention.

FIG. 3 illustrates a second embodiment of this invention wherein corresponding constructions are depicted by identical numerals, but with numerals in FIG. 3 depicting modified constructions being accompanied by a subscript a. As shown, a fuel system 10a comprises means responsive to the level of water therein for closing an outlet passage 24a, including a spherical ball 25a reciprocally mounted in a tubular member 16a. At its maximum upward travel at 25a', the ball will engage an annular or frusto-conically shaped seat 27 defined in member 16 and sized to receive the ball thereon. During normal engine operation, the fuel will enter inlet passage 22, pass through filter 12 and enter outlet passage 24a via a plurality of ports 23a formed circumferentially through the sidewalls of tubular member 16a.

Ball 25a, having a specific gravity greater than that of the fuel but less than that of water, will remain in its solid line position in FIG. 3 during such normal operation of the engine. Should the water in reservoir 15 exceed a predetermined maximum level to thus seep through ports 14, ball 25a will progressively raise in response thereto. Engine performance will be progressively adversely affected upon upward movement of the ball past the ports and to its maximum distance of travel when it engages seat 27. Although a limited amount of fuel may egress through orifice 26 in FIG. 1 and through orifice 26a in FIG. 3 when the respective valve members are at their fully closed positions, such limited amount of fuel may be closely calibrated to place the engine in only an idle or partial power condition of operation, regardless of the operator's manipulation of the throttle lever.

We claim:

1. A fuel filtering system for filtering water contaminated fuel in an operator controlled engine comprising
   a case having an inlet passage and an outlet passage,
   a filter disposed in said case to communicate said fuel from said inlet passage to said outlet passage,
   reservoir means within said case for containing water which separates from said fuel, and
   means responsive to an increasing water level in said reservoir means, said means functioning to progressively decrease flow of said fuel through said outlet passage to a minimum flow range, said minimum flow range functioning to be sufficient to continue operation of said engine while also being effective to alert said operator of said increasing water level.

2. The filtering system of claim 1 further comprising means for enabling a predetermined minimum flow of fuel to be communicated to said outlet passage independent of the functioning of said means responsive to the water level in said reservoir means.

3. The filtering system of claim 1 further comprising a separator disposed in said case such that it divides said reservoir means into a lower and upper reservoir portion, said separator comprising an annular plate, said filter being defined to have its lower end disposed on said separator.

4. The filtering system of claim 1 wherein said filter is tubular and is spaced inwardly from said case to define said inlet passage.

5. The filtering system of claim 4 further comprising a tubular member disposed in radially inwardly spaced relationship within said filter and wherein said outlet passage is defined within said tubular member, said tubular member having port means formed therethrough to communicate fuel from said filter to said outlet passage.

6. The filtering system of claim 5 wherein said tubular member has a radial flange formed externally thereon and further comprising an annular separator plate disposed in said case having a lower end of said filter and said flange disposed thereon.

7. The filtering system of claim 5 further comprising a bolt having a head thereof disposed exteriorly on a lower end of said case, said bolt threadably attached to a lower end of said tubular member.

8. The filtering system of claim 7 further comprising annular sealing means disposed between the head of said bolt and said case for forming a static seal thereat.

9. The filtering system of claim 1 wherein said means responsive to the water level in said reservoir means comprises a valve member movably mounted in said case and port means normally communicating fuel from said filter to said outlet passage, said valve member responsive to said water level to progressively close-off said port means upon movement thereof in said case.

10. The filtering system of claim 9 wherein said valve member has a specific gravity less than 1.0.

11. The filtering system of claim 10 wherein said valve member has a specific gravity between approximately 0.70 and 1.0.

12. The filtering system of claim 9 further comprising a tubular member mounted in said case to define said outlet passage therein and wherein said port means is formed through said tubular member to normally communicate fuel from said filter to said outlet passage and wherein said valve member is movably mounted adjacent to said tubular member for axial movements relative thereto to progressively close-off said port means when the level of water in said case approaches said predetermined maximum.

13. The filtering system of claim 12 wherein said valve member comprises an annular member circumventing said tubular member and reciprocally mounted thereon.

14. The filtering system of claim 12 wherein said valve member comprises a ball reciprocally mounted in the outlet passage defined in said tubular member.

15. The filtering system of claim 14 further comprising an annular seat defined in said tubular member, said ball sized to at least substantially block-off communication of fuel from said port means to said outlet passage when said ball is moved by said water into engagement with said seat.

16. The filtering system of claim 12 further comprising means defining an orifice in said tubular member for communicating fuel from said inlet to said outlet when said valve member closes-off said port means.

17. A method for alerting an operator of a vehicle that a fuel filtering system of an internal combustion engine thereof is contaminated with water, said filtering system comprising an inlet passage, reservoir means, and a filter for communicating fuel to an outlet passage during normal engine operation, comprising the step of progressively decreasing flow of said fuel from said inlet passage to said outlet passage and to said engine to some minimum flow range in response to the increasing level of accumulated water in said reservoir means, said minimum flow range functioning to be sufficient to continue operation of said engine in an idle or partial condition of operation sufficient to alert said operator of said increasing water level.

18. The method of claim 17 wherein said step of progressively decreasing flow comprises moving a valve member to progressively close-off communication of fuel from said filter to said outlet passage.

19. The method of claim 18 wherein said step of moving a valve member comprises floating said valve member on said water.

20. The method of claim 17 further comprising the step of communicating a limited amount of fuel from said inlet passage to said outlet passage independently of said step of progressively decreasing flow to sustain only partial power of said engine.

* * * * *